Figure 1:
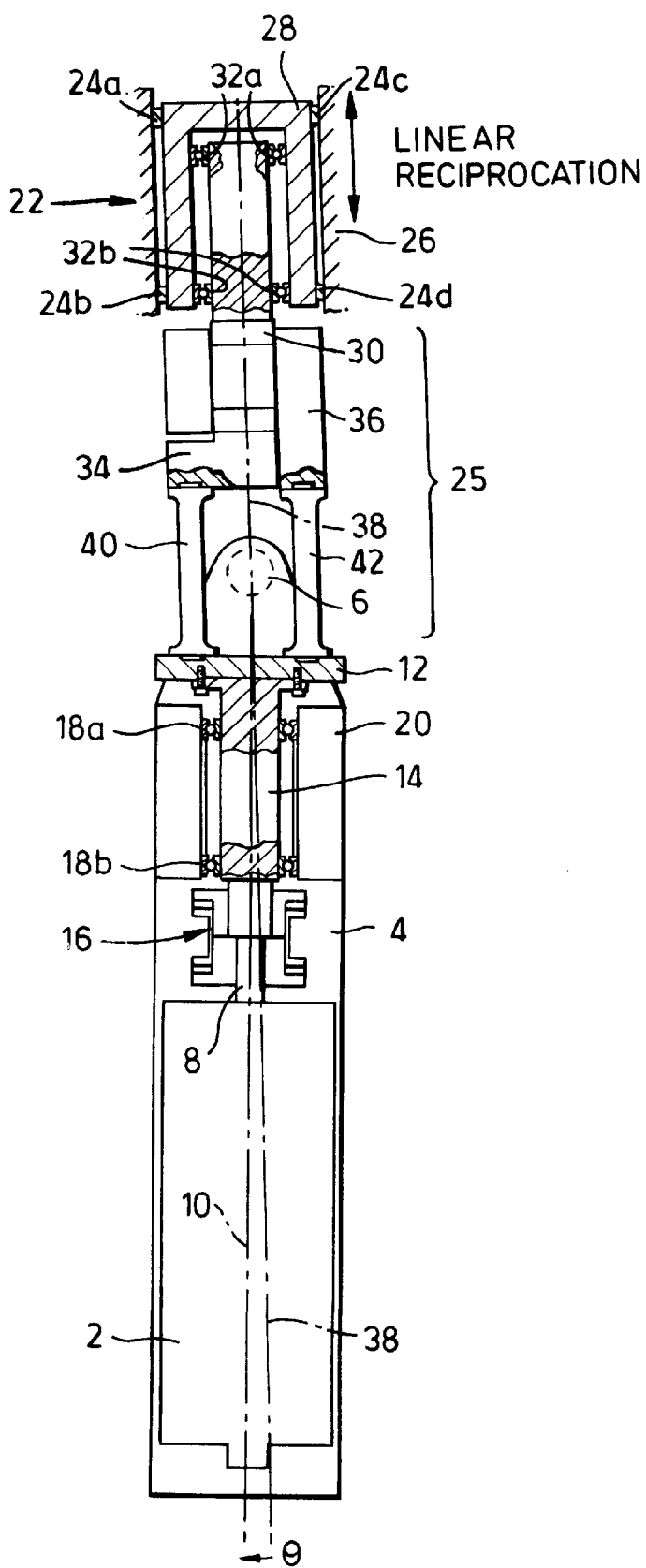

United States Patent [19]
Searle et al.

[11] Patent Number: 6,003,752
[45] Date of Patent: *Dec. 21, 1999

[54] MULTIPLE SYNCHRONIZED LINEAR FRICTION WELDING OSCILLATORS

[75] Inventors: John Gilbert Searle, deceased, late of Hednesford, by John Patrick Searle, executor; Stephen Howard Searle, executor, Chesterfield, both of United Kingdom

[73] Assignee: Rolls-Royce PLC, London, United Kingdom

[ * ] Notice: This patent is subject to a terminal disclaimer.

[21] Appl. No.: 08/986,503

[22] Filed: Dec. 9, 1997

Related U.S. Application Data

[63] Continuation of application No. 08/519,476, Aug. 25, 1995, Pat. No. 5,771,449, which is a continuation-in-part of application No. 08/210,404, Mar. 17, 1994, abandoned.

[30] Foreign Application Priority Data

Dec. 20, 1996 [GB] United Kingdom .................. 9626562

[51] Int. Cl.$^6$ ............................. B23K 20/12; B29C 65/06
[52] U.S. Cl. ............................................ 228/2.1; 156/73.5
[58] Field of Search ................................. 228/112.1, 2.1; 156/73.5

[56] References Cited

U.S. PATENT DOCUMENTS

| | | | |
|---|---|---|---|
| 3,542,275 | 11/1970 | Lloyd et al. . | |
| 3,705,678 | 12/1972 | Searle | 228/2.1 |
| 4,086,122 | 4/1978 | Bouyoucos et al. . | |
| 5,100,044 | 3/1992 | Searle | 228/112.1 |
| 5,148,957 | 9/1992 | Searle | 228/2.1 |
| 5,849,146 | 12/1998 | Searle et al. | 156/580 |
| 5,853,119 | 12/1998 | Searle | 228/112.1 |

FOREIGN PATENT DOCUMENTS 2-199-783  7/1988  United Kingdom .

*Primary Examiner*—Samuel M. Heinrich
*Assistant Examiner*—Carlos J. Gamino
*Attorney, Agent, or Firm*—Oliff & Berridge, PLC

[57] ABSTRACT

A linear friction welding oscillator consists of a plurality of individual linear oscillators which are ganged together so as to operate in unison. The total force exerted by the composite oscillator is thus the sum of the output forces of the individual oscillators. The individual oscillators produce variable amplitude, linear reciprocation of an output ram by converting rotary motion into linear motion using conversion/coupling means such as a swash plate connected by a bending elements to drive a crank. Each of the individual oscillator cranks is rotatably engaged with the output ram so as to transmit to it axial, reciprocal movement due to the angular alignment of the swash plate axis with the ram. All of the individual oscillators are mounted in a common frame in which they can be swung in unison so as to vary and control their individual movements in synchronism.

9 Claims, 2 Drawing Sheets

MULTIPLE SYNCHRONIZED LINEAR FRICTION WELDING OSCILLATORS

This Appln is a con of Ser. No. 08/519,476 filed Aug. 25, 1995 now U.S. Pat. No. 5,721,449 which is a con in-part of Ser. No. 08/210,404 filed Mar. 17, 1994 now ABN.

The invention relates to friction welding oscillators.

In particular, the invention concerns an arrangement in which several linear friction welding oscillators, for example, of the kind described in our earlier filed GB Patent Application No 9526038.6, and a subsequently filed European patent application claiming the priority thereof, may be ganged together.

As discussed in the above mentioned earlier application, amongst others, linear friction welding is a technique of joining two components, or a component to a workpiece, by moving one component relative to the other in a linearly reciprocal movement while urging the interface surfaces together with a force to generate sufficient frictional heat to produce a weld. It will be appreciated from consideration of the factors governing the forces involved that the work required from a welding oscillator is dependent on a number of things including the area of the weld interface, the force applied during the frictional heating phase, and the coefficient of friction between the joint faces. Thus, an oscillator designed for the manufacture of a joint of one size may not be suitable for another joint, especially one of large size. The oscillator may possess either too much power, and thus be wasteful and too expensive to purchase and operate, or it may lack sufficient power to overcome the frictional forces tending to resist linear movement. Consequently, hitherto oscillators have been specifically designed for a particular application or the nearest suitable has been selected from the range of different power oscillators available.

An objective of the present invention is to provide one standard oscillator, such as described in the above mentioned earlier applications and to provide, in addition, means for ganging together a plurality of such individual oscillators to provide a desired output power.

Accordingly the invention provides a linear friction welding oscillator comprising an output ram mounted for linear reciprocal movement, a plurality of rotary prime movers which are ganged together in parallel by a like plurality of rotary to linear motion coupling means to drive the output ram, each of said coupling means being adapted to convert a rotary output of a prime mover into reciprocal linear movement whereby the total output force of the ram is the sum of the forces exerted by the individual prime movers.

In a preferred form of the invention each of the prime movers is carried on a pivoted yoke whereby the amplitude of the reciprocal movement is determined by swinging of the yoke, and the yokes of the individual prime movers are ganged together for synchronous pivotal movement.

Figure 2:
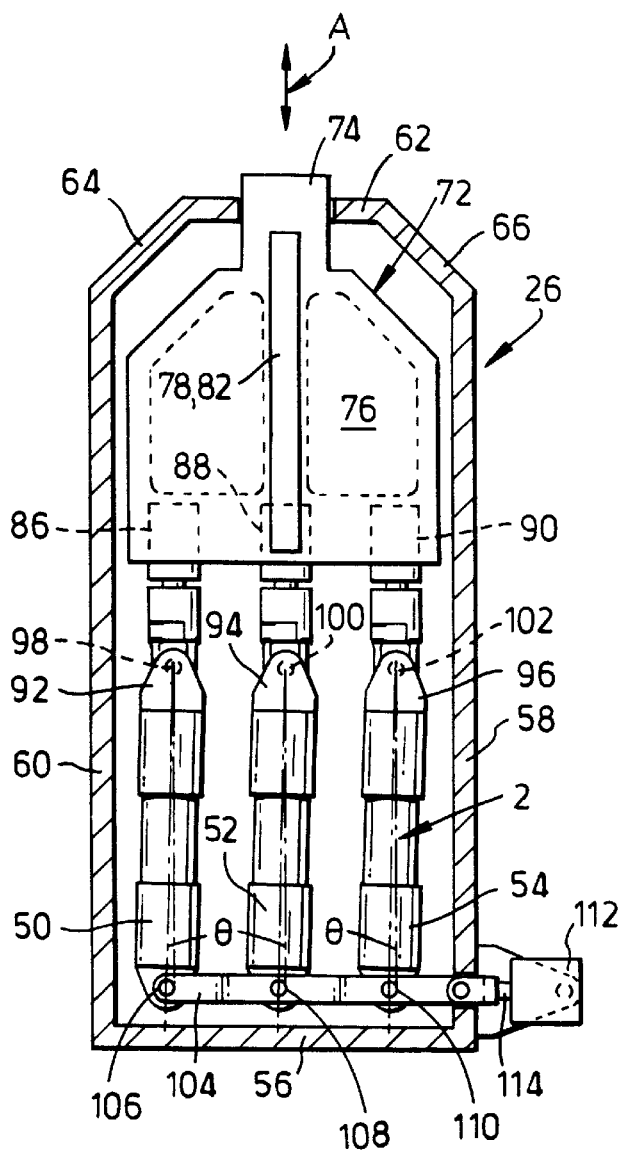
Figure 3:
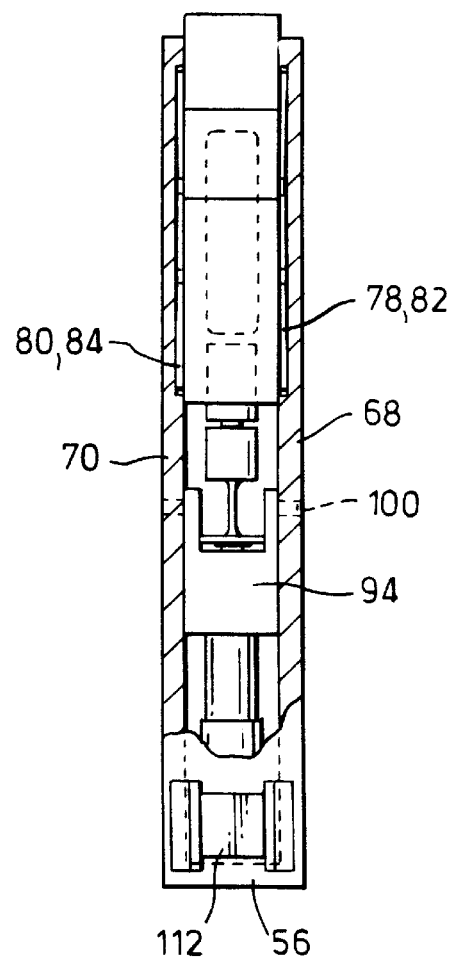
Figure 4:
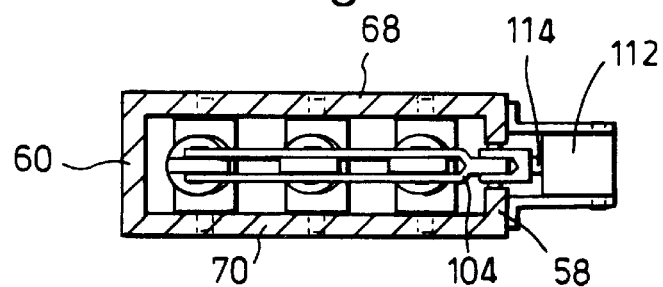

The invention and how it may be carried into practice will now be described by way of example with particular reference to an embodiment illustrated in the accompanying drawings, in which:

FIG. 1 shows an individual linear friction welding oscillator of the kind disclosed in GB Patent Application No 9526038.6, FIGS. 2, 3 and 4 show three mutually orthogonal views of a linear friction welding oscillator of the present invention employing three ganged individual oscillators of the kind shown in FIG. 1.

An individual linear friction welding oscillator of the kind referred to, in general, comprises input shaft rotatable about a first axis, an output shaft rotatable about a second axis, axis movement means adapted to move the angle of the input shaft relative to the axis of the output shaft, coupling means having an input component rotatable with the input shaft and spaced radially from the first axis, and an output component rotatable with the output shaft adapted to couple the input shaft with the output shaft for rotational movement thereby to drive the output shaft, the arrangement being such that when the first and second axes are aligned the input component rotates so as to have no axial movement in the direction of the second axis, but when the first axis is inclined with respect to the second axis the input component rotates so that as it rotates about the first axis it also reciprocates with respect to the second axis thereby causing the output shaft to reciprocate in the direction of the second axis.

The individual oscillator apparatus of FIG. 1 comprises a prime mover 2 in the form of a rotary electric machine rigidly mounted on a frame or yoke 4 which is pivoted at one end about a pivot axis 6. The rotary machine 2 has an output shaft 8 and is mounted on the yoke 4 so that its axis of rotation 10 intersects the pivot axis 6. The output shaft 8 drives a swash plate 12 through a shaft 14 and coupling 16. The shaft 14 is journalled in bearings 18a,18b which are securely mounted in a portion 20 of the frame 4. The bearings 18a,18b and shaft 14 are also arranged co-axially with the motor shaft 8 and rotary axis 10. A flywheel may be provided on the output shaft 8 to increase the angular inertia of the machine, for example this flywheel may consist of a separate item or may be integral with a part of the coupling means 16.

An output ram arrangement, generally indicated at 22, is mounted for linear reciprocation with respect to an earth or reference member 26. This arrangement includes a ram output member 28 slidably mounted in the earth reference member 26, and rotary to linear motion conversion means 25 which converts the motion of the swash plate 12 relative to the axis of reciprocation of ram 28 into linear reciprocal movement. In the arrangement of FIG. 1 ram 28 has a square cross-section which is slidably mounted by means of sliding pads 24a,24b within a square hole formed through the earth reference member 26.

The rotary to linear motion conversion means 25 which converts the motion of the swash plate 12 relative to the axis of reciprocation of ram 28 into linear reciprocal movement comprises a crank 30 on which the ram 28 is journalled by means of bearings 32a,32b. The inner races of these bearings are securely fixed to the journal portion of crank 30 while the outer races are securely fixed in the interior of the cylinder that includes ram 28. The bearings 32a,32b therefore retain freedom for the crank 30 to rotate relative to the ram 28 but restrain the two parts from relative axial movement so that an axial load is transmitted from the crank 30 to the ram 28.

The crank 30 is further formed at one end, the end opposite the portion journalled to the ram 28, with an offset web 34 which is mounted concentrically with an annular balance weight 36. Preferably the crank 30 is formed with a square cross-section on which the balance weight is slidably mounted, this is feasible since the crank and balance weight do not rotate relative one to the other but only reciprocate co-axially. Thus, the crank and the balance weight are mounted for co-rotation about axis 38 while being capable of relative axial movement, at least to a limited extent.

The crank 34 and balance weight 36 are coupled respectively by means of flexible, inextensible ligaments or elements 40,42 to the swash plate 12 at opposite ends of a swash plate diameter. The so-called ligaments or elements 40,42 in the particular embodiment comprise elongate steel bending elements which have flanged ends for attachment between the swash plate 12 and the crank offset 34 and balance weight 36.

The prime mover 2 and the yoke 4 upon which it is carried are arranged so that the axis 6 of the yoke pivot also intersects the crank axis 38. The arrangement, therefore, is that the driving portion of the oscillator comprising the pivotable yoke 4 and parts mounted thereon is capable of being swung about the pivot axis 6 while crank 30 and balance weight 36 are free to rotate and execute linear reciprocal motion, and ram member 28 is free only to reciprocate in an axial direction. These different motions on opposite sides of pivot axis 6 are linked by means of the bending elements 40,42.

In operation, the prime mover 2 is energised to rotate swash plate 12 about the rotary axis 10. Depending upon the angular orientation of motor axis 10 relative to crank axis 38 the ram 22 will execute linear reciprocation with a variable amplitude. This amplitude may be controlled by pivoting the yoke 4 carrying the motor 2 and swash plate 12 about the pivot axis 6.

Since the opposite ends of elements 40,42 are attached to crank offset 34 and balance weight 36 respectively the motion of those components is a combination of rotation around axis 38 and axial reciprocation with respect thereto. The crank balance weight 36 is not connected to any portion of ram 22 but crank 30 is rotatably mounted by means of bearings 32a,32b to ram output member 28. Therefore crank 30 is free to rotate relative to the ram output member 28 but the member, in turn, is restrained from rotation and is able only to reciprocate linearly in the axial direction of axis 38.

When the yoke 4 is swung back so that motor axis 10 lies co-axially with crank axis 38 the motion of element mounting points on swash plate 12 is pure rotation and gives rise to no linear reciprocation of crank 30. Therefore, the amplitude of linear reciprocation can be controlled simply by pivotal alignment of motor frame 4. However, when the yoke 4 is pivoted about axis 6 by an angle o and the swash plate 12 no longer rotates about the ram reciprocation axis 38 and the attachment points of the elements 40,42 to the swash plate begin to reciprocate with respect to the axis 28 as they revolve around axis 10.

Referring now to the welding oscillator arrangement illustrated in the third angle projection views of FIG. 2, 3 and 4, there are shown three individual oscillators of the kind shown in FIG. 1 ganged together to provide a composite oscillator possessing three times the power output. In respect of the components of the individual oscillators like parts carry like references.

In this arrangement the earth reference member 26 is shown more fully as a mounting frame or box-like structure housing the composite arrangement of the three ganged oscillators 50, 52, 54. Individually each of the oscillators is of the kind illustrated in FIG. 1.

The housing generally indicated by member 26 comprises a generally rectangular shaped structure consisting of a base side 56, two elongate sides 58 & 60 spaced apart by the width of the housing, a further side 62 opposite the base 56 which is joined to the sides 58,60 by inclined edges 64,66. The housing is enclosed by top and bottom plane members 68,70 (FIGS. 3 & 4) the edges of which follow the outline of the sides 56–66.

Contained within the housing 26 are the three individual oscillators 50,52,54, a synchronising mechanism, and a composite output ram 72. Generally the ram 72 corresponds to the ram 28 in FIG. 1 but here is to be driven by the three oscillators in parallel.

The ram 72 comprises an output member 74 which protrudes through an aperture in the end wall 62 of the housing. The sides of the member 74 may be journalled in the end wall 62 by means of sliding bearings (not shown) which provide lateral location of the member 74, and assist in locating the ram 72. The output member 74 is joined to or formed integrally with a delta-shaped main portion 76 of the ram which is enclosed within the housing 26. This main ram portion 76 is also slidably supported in the housing by means of longitudinal extending keys 78,80 engaged in keyways 82,84 formed in the top and bottom side walls 68,70 respectively. The keyways 82,84 are disposed in the longitudinal direction of side walls 58,60, and perpendicular to the end walls 56,62 so that the ram is free to reciprocate the output member 74 in the longitudinal direction.

The three oscillators 50,52,54 are mounted side by side and in parallel within the housing 26. They are coupled to drive the ram 76 in unison, the arrangement serving to synchronise the movement of the output members of the individual oscillators. As a result the total force exerted by the output member 74 is the sum of the output forces of the individual oscillators. Compared to the parts described and referenced in relation to the oscillators of FIG. 1 each of the output crank members 30 of the oscillators is engaged with the delta-shaped main portion of the ram 76. Along the base side of the ram 76 there are formed crank receiving pockets 86,88,90 spaced apart at the same pitch as the oscillators 50,52,54 into which the cranks 30 are inserted. The cranks are engaged with the ram 76 by means of axial force transmitting, rotary bearings located inside the pockets. Thus, in the same manner as a crank 30 is able to rotate relative to the ram 28 of an individual oscillator of FIG. 1 but simultaneously transmit axial reciprocal motion to it, so the corresponding rams of the three oscillators 50,52,54 are free to rotate relative to the ram 76 while simultaneously transmitting to it axial reciprocal movement.

Also in common with the single oscillator of FIG. 1 each of the oscillators 50,52,54 is pivotally mounted, so that as previously described the amplitude of the movement of each linear oscillator output member is variable between a maximum value and zero. The prime movers of the three oscillators are mounted in respective ones of three pivotable yokes 92,94,96 which have parallel axes 98,100,102 spaced apart across the width of the housing 26. The distal ends of the pivoted yokes are coupled together by a synchronising drawbar 104 disposed laterally across the housing close to the end wall 56. The yokes 92,94,96 are pivotally coupled to the drawbar 104 at locations 106,108,110 respectively for synchronous pivotal movement. The drawbar 104 is preferably bifurcated, as shown in FIG. 4, so as to avoid any tendency to twist the yokes. One end of the drawbar 104 is connected to an actuating mechanism 112 located in a side wall 58 of the housing 26. The mechanism 112 basically consists of an hydraulically actuable cylinder and piston carried on the side wall of the housing with an actuator output member 114 extending through an aperture in the side wall 58 and coupled to the end of the drawbar 104. By positioning the drawbar substantially linearly in the direction of its own length all of the individual oscillators may be pivoted in unison.

Thus, each individual linear oscillator is mounted for movement relative to a reference position, all of the oscillators are ganged together for synchronous movement. The amplitude of that movement is variable and controlled by operating the actuator mechanism 112. The drawbar 104 is moved laterally across the oscillator housing 26 causing the individual oscillators 50,52,54 to swing in unison about their respective pivots 98,100,102. As in the case of the single oscillator varying the angular orientation of the individual oscillators in unison relative to a reference axis is used to control the stroke of the composite oscillator.

It will be readily understood that various parts of the apparatus described above may be altered, varied and substituted while retaining the principle of operation and construction of the invention. For example: the prime movers mentioned above comprise rotary electric motors but other forms of motor could be substituted; the coupling means between the prime mover and the ram driving crank is illustrated as a swash plate with bending elements but a ball and socket arrangement as described in our co-pending application claiming priority from GB 9526038.6 could also be used; the amplitude control actuator is represented as an hydraulic cylinder and piston but could be substituted by, amongst other things, a rotary actuator. Other features of the embodiment such as the shape of the housing, the shape of the ram, and the design of the housing may be changed. The number of individual oscillators utilised, as already foreshadowed is chosen to fulfil the power requirement of the overall oscillator; also although these are shown mounted side by side so that all push and pull in unison it would be possible to mount the selected number of oscillator in some other configuration, in a delta or square arrangement, for instance.

It is claimed:

1. A linear friction welding oscillator comprising an output ram mounted for linear reciprocal movement, a plurality of individual linear oscillators each of which has an output member mounted for linear reciprocal movement, the plurality of individual linear oscillator output members drivingly coupled to the output ram, whereby, when the individual linear oscillators are energised simultaneously, the total force available from the output ram is the sum of the output forces of the individual linear oscillators, wherein each individual linear oscillator is mounted for angular movement relative to a reference position to vary its amplitude of movement, depending upon its individual angular orientation relative to a reference axis, and the plurality of individual linear oscillators are ganged together for synchronous movement and mounted with all of the reference axes in parallel.

2. A linear friction welding oscillator as claimed in claim 1 wherein the amplitude of movement of each of the individual linear oscillator output members is variable between a maximum value and zero.

3. A linear friction welding oscillator comprising an output ram mounted for linear reciprocal movement, a plurality of individual linear oscillators each of which has an output member mounted for linear reciprocal movement, the plurality of individual linear oscillator output members drivingly coupled to the output ram, a mounting structure and a frame structure, wherein the output ram is mounted for reciprocal movement relative to the frame structure, each individual linear oscillator including a prime mover mounted for pivotal movement relative to the frame structure, whereby, when the individual linear oscillators are energised simultaneously, the total force available from the output ram is the sum of the output forces of the individual linear oscillators.

4. A linear friction welding oscillator as claimed in claim 3 wherein the prime mover is carried by a yoke pivoted relative to the structure.

5. A linear friction welding oscillator as claimed in claim 3 further comprising synchronising means for pivoting the individual oscillators in unison.

6. A linear friction welding oscillator as claimed in claim 5 wherein the synchronising means comprises a drawbar connecting the individual oscillators.

7. A linear friction welding oscillator as claimed in claim 5 further comprising actuator means connected to the synchronising means for moving the individual oscillators in unison.

8. A linear friction welding oscillator as claimed in claim 7 wherein the actuator means is arranged for substantially linear movement to pivot the individual oscillators.

9. A linear friction welding oscillator as claimed in claim 8 wherein the actuator means includes a linear actuator connected to one end of the drawbar.

* * * * *